United States Patent [19]

Stolpin

[11] 4,355,781
[45] Oct. 26, 1982

[54] KIT FOR ASSEMBLING GEODESIC STRUCTURE

[76] Inventor: Roger M. Stolpin, 1629 Ohio Ave., Flint, Mich. 48055

[21] Appl. No.: 316,611

[22] Filed: Oct. 30, 1981

Related U.S. Application Data

[62] Division of Ser. No. 101,398, Dec. 7, 1979, Pat. No. 4,309,852.

[51] Int. Cl.³ .......................... B28B 7/16; B28B 7/20; B28B 7/28
[52] U.S. Cl. .................................................... 249/64
[58] Field of Search ...................... 249/64, 63, 98, 99, 249/101, 177, 183, 184; 425/546, DIG. 58

[56] References Cited

U.S. PATENT DOCUMENTS

| | | | |
|---|---|---|---|
| 1,976,628 | 10/1934 | O'Rourke | 249/99 X |
| 2,283,968 | 5/1942 | Bunch | 249/99 X |
| 4,101,256 | 7/1978 | White et al. | 249/184 X |
| 4,245,809 | 1/1981 | Jackson | 425/546 X |

*Primary Examiner*—J. Howard Flint, Jr.
*Attorney, Agent, or Firm*—Reising, Ethington, Barnard, Perry & Brooks

[57] ABSTRACT

A kit for assembling a geodesic structure is disclosed as including a plurality of polygonal panels (12) preferably of triangular shapes so as to be assembled to define a sphere (10). Each panel is of a unitary construction molded from plastic and includes a first set of male lugs (20) and a second set of female lugs (22) projecting from its sides (14). The female lugs (22) are arranged in pairs and spaced along the length of the associated panel side so as to receive a male lug (20) on one side of another panel in order to provide a connection (16) therebetween. Outer ends on both the male and female lugs include connection surfaces (24, 26) that snap into engagement with each other as the male lug (20) of each connection (16) is inserted between the associated female lugs (22) in order to secure the panel sides (14) and thereby prevent relative movement between the panels lengthwise and transversely with respect to the length of each side. The preferred construction of each triangular panel includes elongated side members (18) that define a central opening of the panel and the sides thereof with the connection lugs (20, 22) projecting outwardly therefrom in the plane of the panel. A unitary injection molding (28) of plastic incorporates six triangular panels of constructions that allow the assembly of a geodesic sphere from thirty such moldings. A die (40) for injection molding the panels includes insert balls (46) for providing depressed connection surfaces on the lugs. Resilient mounts (48) for the balls permit movement thereof on a section of the die such that a molded panel can be easily removed.

4 Claims, 10 Drawing Figures

KIT FOR ASSEMBLING GEODESIC STRUCTURE

This is a division, of application Ser. No. 101,398 filed Dec. 7, 1979 now U.S. Pat. No. 4,309,852.

TECHNICAL FIELD

This invention relates generally to geodesic structures and, more particularly, to a kit for assembling a geodesic structure from a plurality of unitary panels that are molded from plastic.

BACKGROUND ART

Geodesic structures are assembled from polygonal panels of generally planar shapes that are small enough in size so that the assembled structure has a generally curved outer surface in relationship to its total size. Most often, geodesic structures are constructed with a spherical or partially spherical shape from triangular panels that are connected upon assembly. Such partially spherical geodesic structures have been used to a great extent in the past for the construction of shelters such as houses and other buildings. It is also possible to construct geodesic structures with other shapes such as in the form of a parabola whose panels include mirror surfaces that focus light from the sun at a point in order to provide a solar collector. Likewise, other geodesic structures can also be devised wherein relatively small planar panels define a generally curved shape upon connection of the panels during assembly.

U.S. Pat. No. 4,012,872 discloses geodesic structures whose panels are pivotally connected so as to automatically generate the required angular relationship between adjacent panels upon assembly in order to provide the desired shape.

U.S. Pat. No. 3,871,143 discloses triangular panels that are connected by spring clips in order to provide beach or play structures. In one embodiment, the spring clip is fixed to one of a pair of adjacent panel sides and snaps over the other side to prevent transverse movement of the sides with respect to each other. However, this embodiment of the spring clip does not prevent movement of the panel sides lengthwise with respect to each other. Another embodiment of the triangular panel disclosed by this patent has its sides provided with recesses that are aligned with recesses in a like panel in order to receive a separate clip that is secured to each of the panels within the aligned recesses. While this embodiment of the spring clip will prevent lengthwise movement of the panels along their sides with respect to each other, the provision of a separate clip that is not mounted on the panel sides necessarily results in additional components that must be handled during assembly.

Other geodesic-like structures are disclosed by U.S. Pat. Nos. 3,362,127; 3,485,000; and 3,744,205.

DISCLOSURE OF INVENTION

An object of the present invention is to provide a kit for assembling a geodesic structure from polygonal panels that are molded with a unitary construction from plastic.

In carrying out the above object, the polygonal panels are preferably injection molded from plastic with a planar configuration and have straight sides including a first set of male lugs and a second set of female lugs projecting from the sides. The female lugs are arranged in pairs with the lugs of each pair spaced along the length of the associated panel side so as to receive a male lug on one side of another panel in order to provide a connection between the panels. Both the male and female lugs include outer ends having connection surfaces that snap into engagement with each other as the male lug of each connection is inserted between the associated female lugs. Cooperation between the lugs on the adjacent panel sides prevents relative movement therebetween along the lengths of the sides and transversely with respect thereto in order to fix the panels with respect to each other.

In its preferred construction disclosed, the panels of the kit are in the shapes of triangles and are connected to each other to define a geodesic sphere that has particular utility as an educational toy. However, other polygonal panels with four or more sides can also be utilized for various purposes in practicing the invention.

Preferably, each panel side includes both male and female lugs and the lugs project outwardly away from the associated panel sides generally within the plane of the panel. Elongated side members of the panels have ends that are connected to each other and define a central opening of the panel with the lugs projecting outwardly from the side members. Each side member has a cross-section that is elongated in a direction perpendicular to the plane of the associated panel such that connection of two side members by the lugs thereof defines an I-beam configuration for strengthening the geodesic structure assembled from the panels.

An injection molding that is made with a unitary construction of plastic incorporates six triangular panels such that thirty of such moldings can be utilized to provide the kit for assembling a geodesic sphere. A central sprue of the molding has six gates projecting outwardly in a radial manner therefrom with six triangular panels located between the gates and connected thereto.

A first pair of triangular panels of the molding are identical to each other and have an isosceles shape with a base side of a shorter length than its equal sides. The lugs on one of the equal sides of each panel of the first pair are positioned and of the proper gender so as to interfit with the lugs on the other equal side of the other panel of the first pair.

A second pair of the triangular panels of the molding are also identical to each other and of an isosceles shape whose base side is also shorter than its equal sides and whose size and shape is the same as the panels of the first pair. The lugs on the equal sides of the second pair of triangular panels are positioned the same and of the same gender as the lugs on the equal sides of the first pair of triangular panels. The base side on each triangular panel of the second pair has the lugs thereon positioned and of the proper gender so as to interfit with the lugs on the base sides of the triangular panels of the first pair.

A fifth triangular panel of the molding has an isosceles shape whose base side is longer than its equal sides. The lugs on one of the equal sides of the fifth panel are positioned and of the proper gender so as to interfit with the lugs on the corresponding other equal side of another like panel. The lugs on the base side of the fifth panel are positioned and of a proper gender to interfit with lugs on the base sides of the first pair of the triangular panels.

A sixth triangular panel of the molding also has an isosceles shape whose base side is longer than its equal sides and whose size and shape is equal to the fifth panel. The lugs on the equal sides of the sixth panel are positioned the same and of the same gender as the lugs on the equal sides of the fifth panel, and the lugs on the base side of the sixth panel are positioned and of the proper gender to interfit with the lugs on the base sides of the second pair of triangular panels and with the lugs on the base side of the fifth panel.

Upon removal of the triangular panels from the thirty plastic moldings that provide the kit, assembly of the sides thereof by the snap connections provided by the lugs provides a geodesic sphere with one hundred eighty panels.

Six triangular dies are arranged in a generally hexagonal shape in order to provide the injection molding of the six triangular panels such that thirty of such moldings can be used to assemble a geodesic sphere. Each die includes a pair of die sections having respective cavity sections such that the die sections cooperate to define a cavity within which the injection molding of the associated panel can be performed. Inserts are received within the cavity to provide depressed connection surfaces on one set of the connection lugs. Resilient mounts resiliently position the inserts on one of the die sections while permitting movement thereof with respect thereto so that a molded panel can be conveniently removed from the die sections without a die lock situation that would prevent such removal.

The inserts of the die preferably comprise balls and each resilient mount includes a spring that resiliently positions the associated insert ball on the die section. Each resilient mount also includes a shaft having one end connected to the associated insert ball and another end biased by the spring in order to position the ball. Counterbored holes are provided within the die section on which the insert balls are mounted, and each hole has a small end with a partially semispherical seat for receiving the associated insert ball and also has a large end for receiving the spring. The spring is preferably of the helical type with the ball shaft extending therethrough. A first end of the spring is engaged with a seat of the counterbored hole intermediate the small and large ends thereof and a second end of the spring is engaged with the adjacent end of the ball shaft to provide the resilient biasing of the insert ball connected to the opposite end of the shaft.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
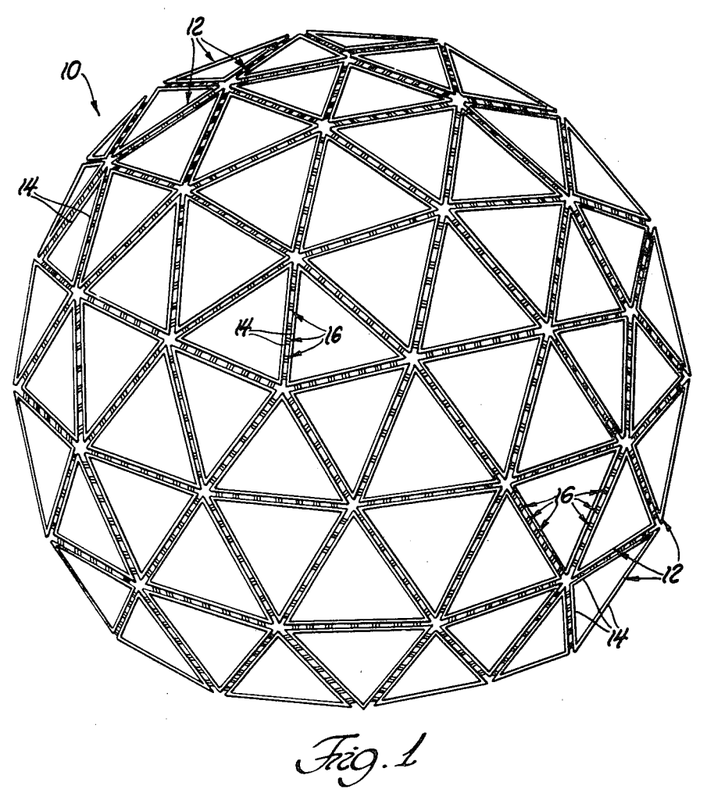
FIG. 1 is a perspective view of a geodesic structure in the form of a sphere that has been constructed from a kit according to the present invention.

Referring to FIG. 1 of the drawings, a geodesic structure embodied by a sphere 10 is assembled from a kit according to the present invention and includes a plurality of polygonal panels 12 of triangular shape. Each triangular panel 12 has a unitary construction that is molded from a suitable plastic preferably by an injection molding process with polycarbonate plastic. Straight sides 14 of each panel 12 are secured to the sides of adjacent panels by schematically indicated lug connections 16.

Figure 2:
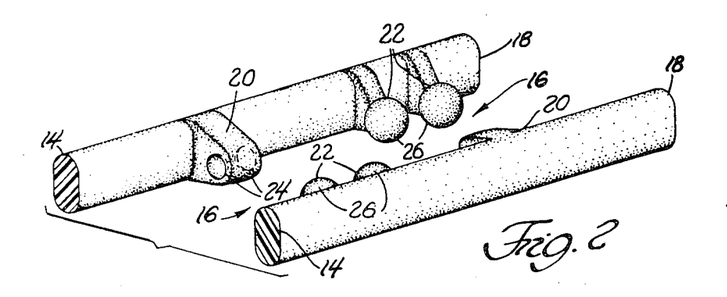
FIG. 2 is a partial view showing two adjacent panel sides and the manner in which lugs thereon provide connections that secure the panels to each other.

As seen by additional reference to FIG. 2, the straight sides 14 of each panel are defined by elongated side members 18. A first set of male lugs 20 on the side members 18 and a second set of female lugs 22 thereon project outwardly from the panel sides in the planes of their associated panels in order to cooperatively provide the connections 16 that secure the panels to each other. The female lugs 22 are arranged in pairs so as to receive an associated male lug 20 therebetween upon assembly. Outer ends of the male lugs 20 and the female lugs 22 include connection surfaces that snap into engagement with each other as the male lug of each connection 16 is inserted between the associated female lugs. Sockets 24 on the outer ends of the male lugs 20 provide the connection surfaces thereof while balls 26 on the outer ends of the female lugs 22 provide their connection surfaces. The spacing between the balls 26 is small enough so as to provide an interference fit as the associated male lug 20 is inserted therebetween and is large enough so that deflection of the female lugs permits the snap action connection as the balls engage the sockets to secure the panels to each other.

Assembly of the panels 12 illustrated in FIG. 1 by the snap connection 16 shown in FIG. 2 prevents relative movement between the side members 18 defining the panel sides both along the lengths thereof and transversely with respect to the length of each panel. Each side member 18 has a cross-section that is elongated in a direction perpendicular to the plane of the associated panel. Upon connection of two side members by the connection thereof, an I-beam configuration is defined due to the cross-sections of the side members and strengthening of the assembled geodesic sphere thus results. As the panels are assembled, the geometric restraints in constructing the hexagons and pentagons that are defined by the triangular panels automatically generate the dihedral angles between the planes of adjacent panels. Such considerations involved with assembling the sphere and the geometric relationships involved render the kit from which the sphere is made useful as an educational toy.

Figure 3:
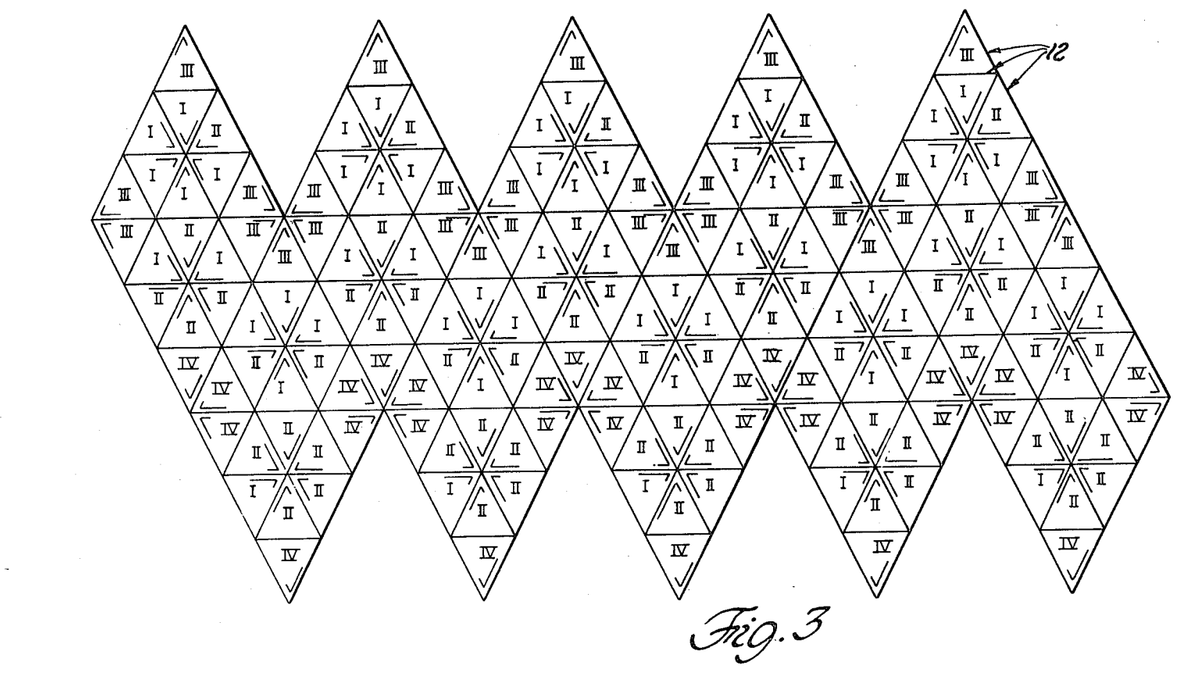
FIG. 3 is a schematic view illustrating the manner in which triangular panels of the kit are secured to each other to provide the geodesic sphere shown in FIG. 1.

With reference to FIG. 3, the panels 12 are assembled as shown with the Roman numeral indications I, II, III, and IV corresponding to the triangular panels shown in FIGS. 4, 5, 6, and 7, respectively, to provide the geodesic sphere 10 shown in FIG. 1. These triangular panels are preferably provided as part of thirty unitary plastic moldings 28 such as shown in FIG. 8. A discussion of the construction of the molding 28 will be preceded by a discussion of the triangular panels I, II, III, and IV.

Each of the triangular panels 12 illustrated in FIGS. 4 through 7 is of an isosceles shape with the side members 18 thereof defining a central triangular opening 12' of the panel. The male lugs 20 and the female lugs 22 project outwardly from the sides 14 defined by the side members 18 generally within the plane of the associated panel so that the connections therebetween are along centerlines of the panel sides 14 through the connection surfaces embodied by the sockets 24 and balls 26 on the outer ends of the lugs.

Figure 4:
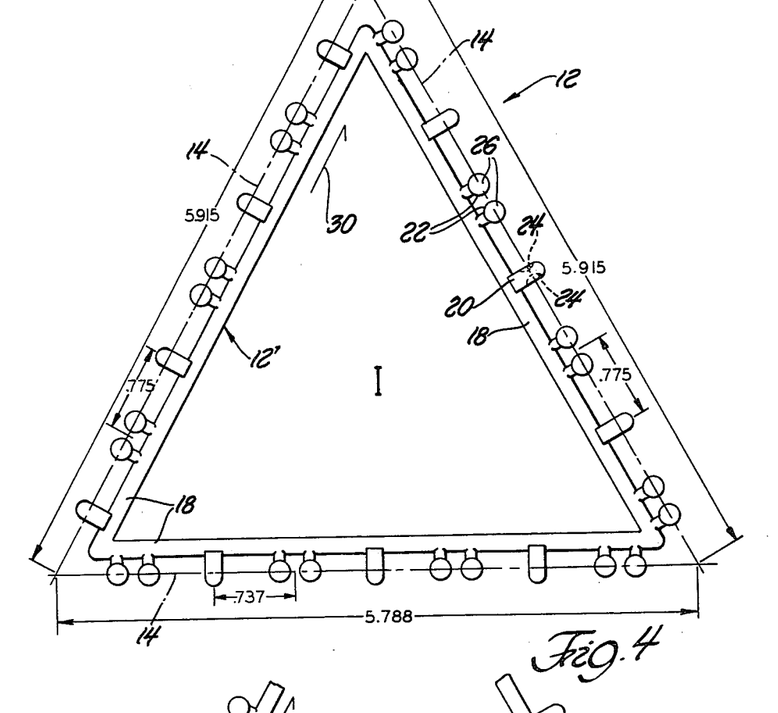
FIGS. 4 through 7 are views which illustrate the triangular panels of the kit.

With particular reference to FIG. 4, triangular panel I has an isosceles shape whose base side is of a shorter length than the length of its equal sides. As shown, the lengths of the panel sides 14 along the centerlines through the lug connection surfaces are 5.788 inches for the base side and 5.915 inches for each of the equal sides. The male and female connection lugs 20 and 22 on one of the equal sides of triangular panel I are positioned and of the proper gender so as to interfit with the lugs on the corresponding other equal side of another like panel. As shown, the position between the center of each male lug 20 and a midpoint between each pair of adjacent female lugs on the equal sides is 0.775 inches. The corresponding distance between the lugs on the base side of the triangular panel I is 0.737 inches.

Figure 5:
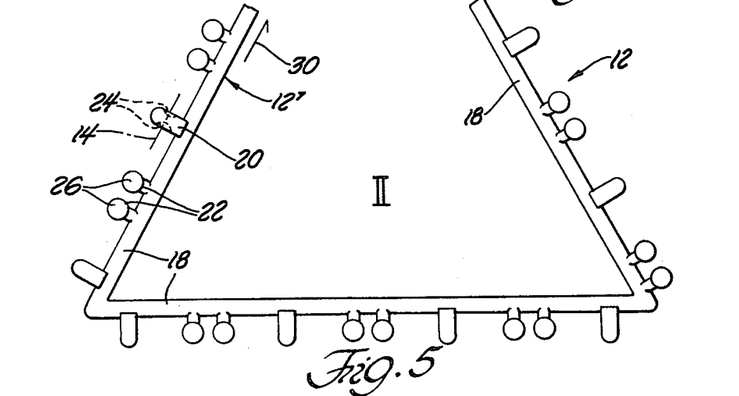

As seen in FIG. 5, each triangular panel II is also of an isosceles shape whose base side is shorter than its equal sides and whose size and shape is the same as triangular panel I shown in FIG. 4. The male and female connection lugs 20 and 22 on the equal sides of triangular panel II are positioned the same and of the same gender as the lugs on the equal sides of triangular panel I. Thus, each equal side of triangular panel II interfits with the corresponding other equal side of another like panel, and the left and right equal sides of triangular panel I respectively interfit with the right and left equal sides of triangular panel II to provide connection of the panels to each other. On the base side of triangular panel II, the connection lugs 20 and 22 are positioned with respect to each other in the same spacing as the base side of the triangular panel I but of an opposite gender so as to interfit therewith in order to enable panels I and II to be connected at their base sides.

As seen in FIG. 3, sixty of each of the triangular panels I and II shown in FIGS. 4 and 5 are required in order to assemble the geodesic sphere 10 shown in FIG. 1. As such, the plastic molding 28 from which the sphere is constructed by provision of thirty such moldings includes a first pair of the triangular panels I and a second pair of the triangular panels II. Only thirty of a fifth triangular panel III and a sixth triangular panel IV of the molding are required and, as such, only one of each of these triangular panels is required on each molding in order to give the proper number of each panel for constructing the sphere from thirty of the moldings.

Figure 6:
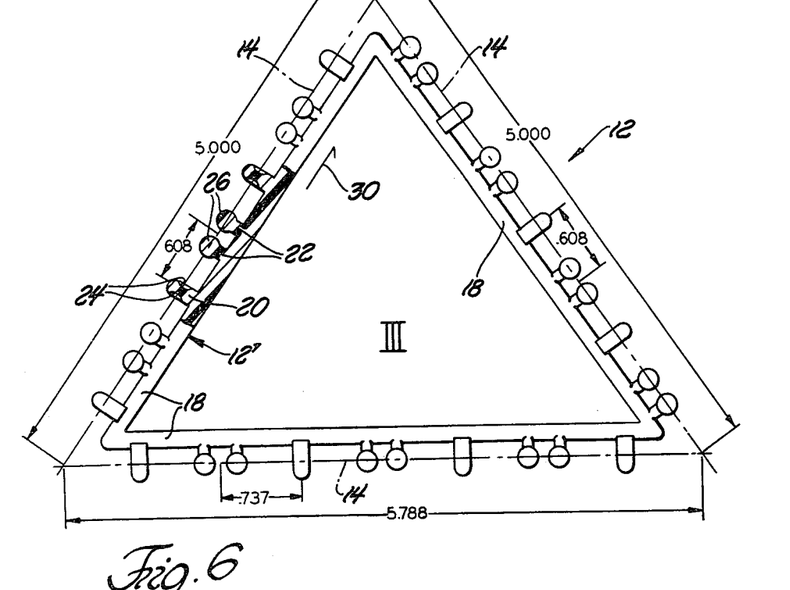

As seen in FIG. 6, the fifth triangular panel III of the plastic molding has an isosceles shape whose base side is longer than its equal sides. As shown, the lengths of the panel sides 14 along the centerlines through the lug connection surfaces are 5.788 inches for the base side and 5.000 inches for the equal sides. The lugs on one of the equal sides of triangular panel III are positioned and of the proper gender so as to interfit with the lugs on the corresponding other equal side of another like panel. As shown, the spacing between the center of each male lug 20 on the equal sides of the triangular panel III and the midpoint between each pair of female lugs 22 adjacent thereto is 0.608 inches. The lugs on the base side of triangular panel III are positioned and of the proper gender so as to interfit with the base side of triangular panel I shown in FIG. 4, i.e., the spacing between these lugs is 0.737 inches on both triangular panels I and III but the lugs on the base sides of each are of opposite gender.

Figure 7:
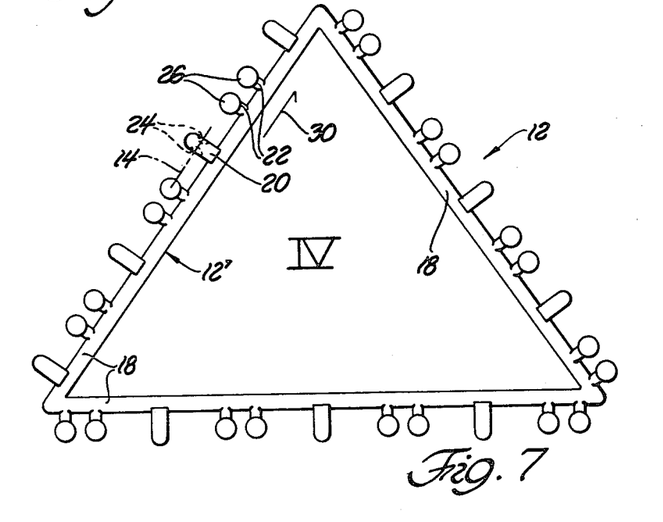
Figure 8:
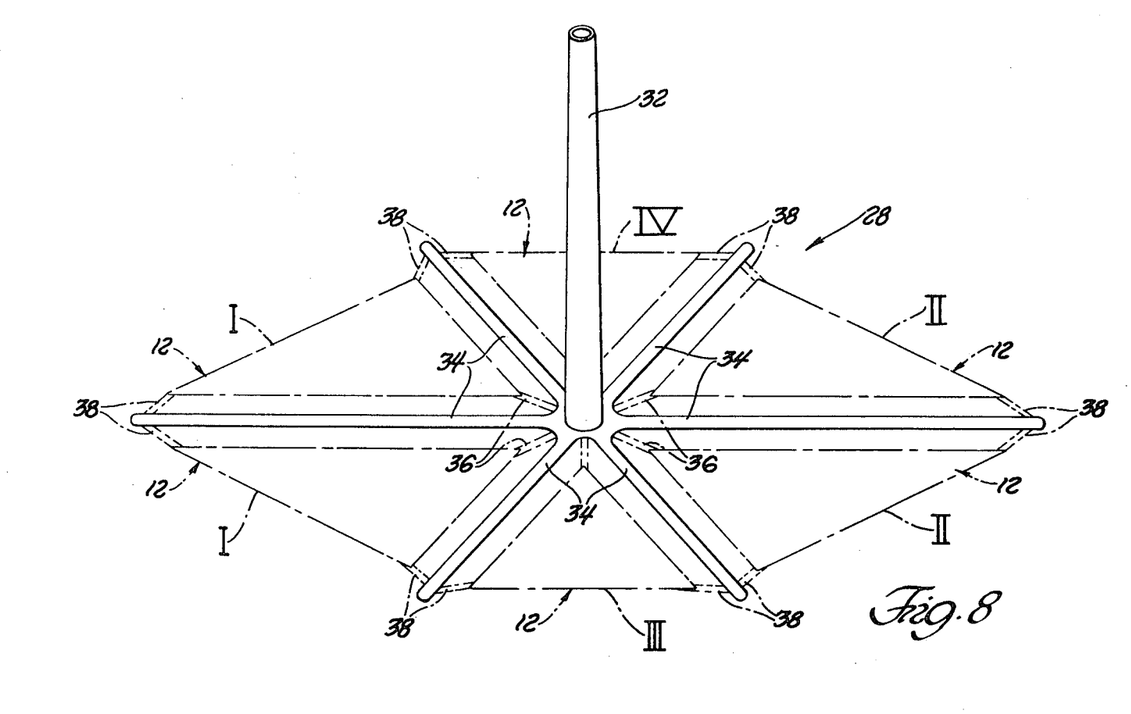
FIG. 8 is a perspective view that illustrates a unitary injection molding made from plastic to provide the triangular panels shown in FIGS. 4 through 7 such that thirty of such moldings can be utilized to assemble the geodesic sphere shown in FIG. 1.

Referring to FIG. 7, the sixth triangular panel IV also has an isosceles shape whose base side is longer than the equal sides thereof and whose size and shape is the same as the triangular panel III shown in FIG. 6. The male and female connection lugs 20 and 22 on the equal sides of the triangular panel IV shown in FIG. 7 are positioned the same and of the same gender as the lugs on the equal sides of the triangular panel III shown in FIG. 6. Thus, each equal side of triangular panel IV interfits with the corresponding other equal side of another like panel, and the left and right equal sides of the triangular panel III will respectively interfit with the right and left equal sides of the triangular panel IV to provide connection of these panels to each other. The male and female connection lugs 20 and 22 on the base side of the triangular panels IV shown in FIG. 7 are positioned and of the proper gender so as to interfit with the base sides on both the triangular panel II shown in FIG. 5 and the triangular panel III shown in FIG. 6.

With combined reference to FIGS. 4 through 7, it will be noted that each of the triangular panels I, II, III, and IV is illustrated with an indicating arrow 30 and similar unnumbered arrows are shown in FIG. 3 in order to orient each triangular panel upon assembly thereof to the other panels in order to provide the geodesic sphere illustrated in FIG. 1. Thus, when all of the panels are assembled in the layout shown by FIG. 3 and then connected to each other, the sphere 10 illustrated in FIG. 1 results with the required dihedral angles defined between the planes of adjacent panels.

With further reference to FIG. 8, each plastic molding 28 includes a central sprue 32 which can be conveniently broken off from the rest of the molding so that the thirty moldings required to assemble the geodesic sphere will pack neatly in a box or other storage container. Six gates 34 project radially from the lower end of the central sprue 32 to support the triangular panels I, II, III, and IV which are illustrated schematically. An inner gate connection 36 and a pair of outer gate connections 38 support the vertices of the triangular panels and allow the panels to be broken away from the molding in order to assemble the geodesic sphere.

The socket and ball construction of the connection surfaces 24 and 26 is preferred although others can also be used. Also, it is possible to reverse the respective positions of the sockets 24 and balls 26 on the male and female lugs 20 and 22 without inhibiting the connection of the panels to each other.

Figure 9:
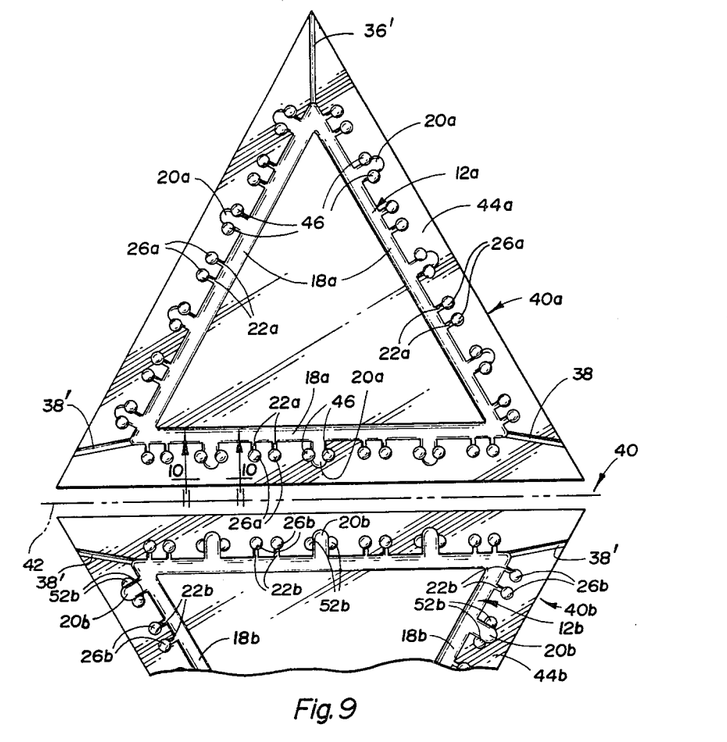
FIG. 9 is a view of two sections of a die for injection molding the panels.

With reference to FIG. 9, a triangular die generally indicated by 40 is shown to illustrate the manner in which the triangular panel I of FIG. 4 is injection molded from plastic. Six triangular dies similar to this die 40 are arranged in a generally hexagonal shape in order to provide the unitary injection molding of six panels in the manner previously described. Die 40 includes a pair of die sections 40a and 40b which are shown in an open position on opposite sides of a phantom line 42. Either die section is pivotal about line 42 for movement to a closed position with respect to the other die section in preparation for performing the injection molding of the triangular panel. The face surfaces 44a, b of the die sections are machined to respectively include cavity sections 12a, b such that closure of the die sections defines a cavity in which the triangular panel can be injection molded. An inner gate opening 36' and a pair of outer gate openings 38' provide for injection of the hot plastic into the cavity as the molding is performed.

With continuing reference to FIG. 9, each cavity section 12a, b includes an elongated groove 18a, b for defining the side members of the triangular panel. Projections 20a, b and 22a, b of the cavity sections are provided to respectively define the male and female lugs that are used to secure the panels to each other. As will be hereinafter described, inserts in the form of balls 46 are mounted on the die section 40a so as to define the depressed socket connection surfaces of the male lugs. Semispherical depressions 26a, b of the female lug portions 22a, b define the ball connection surfaces of the female lugs upon molding.

Figure 10:
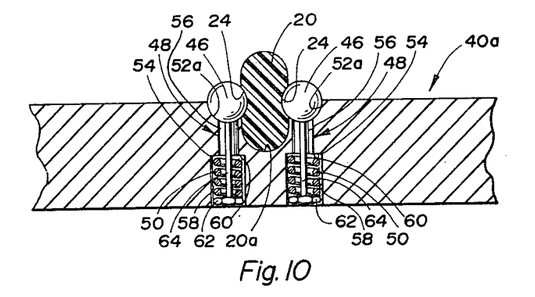
FIG. 10 is a sectional view taken along line 10—10 of FIG. 9 and illustrating the construction of resilient mounts for inserts of the die.

With reference to FIG. 10, a resilient mount 48 supports the balls 46 on the die section 40a at opposite sides of the cavity portion 20a, b within which the associated male lug 20 is molded. Balls 46 project outwardly into the male lug cavity portion sufficiently far in order to define the depressed socket connection surfaces 24 during the molding. After the molding and the required cooling, the triangular panel can be removed and the resilient mounts 48 then permit movement of the balls 46 in order to prevent a die lock situation that would hold the molded part to the die section. Of course, the configuration of the female lugs does not require any special provision in order to permit removal of the molded part.

As seen by continuing reference to FIG. 10, each resilient mount 48 includes a spring 50 for biasing the associated ball 46 to a seated position within a partial semispherical seat 52a of the die section. Similar seats 52b shown in FIG. 9 on the die section 12b receive the balls 46 upon closure of the die sections so that the springs 50 do not have to bear the force required to hold the balls during molding. A counterbored hole 54 associated with each resilient mount extends through the die section 40a and has a small end 56 whose outer extremity includes the ball seat 52a. A large end 58 of hole 54 receives the spring 50 which is of the helical type. An intermediate seat 60 of the hole 54 is located between the small and large ends 56 and 58 and faces the large end in which the spring 50 is received. One end of spring 50 engages the seat 60 while another end thereof is engaged with a nut 62 threaded onto one end of a shaft 64 whose other end is secured to the ball 46. Thus, the bias of spring 50 resiliently maintains the ball 46 within its associated ball seat. Upon opening of the die sections and removal of the molded panel, the balls 46 are moved away from die section 40a against the bias of their associated springs 50 and pivotal movement of the shafts 46 about their ends secured to nuts 62 permits the balls to move away from each other so that the male lug 20 therebetween is freed from the balls without any die lock situation. After such removal, the springs 50 then again move the balls 46 back to the position shown ready for the next molding cycle.

As previously mentioned, the respective positions of the ball connection surfaces on the female lugs and the depressed socket connection surfaces on the male lugs can be reversed from that shown and, in such case, appropriate modifications will have to be made to the injection molding die illustrated in FIGS. 9 and 10 in order to accommodate such change. Nevertheless, the resilient mounts 48 described for the ball inserts 46 are still usable in the manner discussed regardless of the respective set of lugs on which the ball and socket connection surfaces are located.

While the best mode for carrying out the present invention has herein been described in detail, those familiar with the art to which this invention relates will recognize various alternative designs and embodiments for practicing the present invention as defined by the following claims.

What is claimed is:

1. A die for injection molding plastic polygonal panels having male and female connection lugs for connecting a plurality of such panels by a snap action assembly to provide an assembled structure, said die comprising: a pair of die sections; each die section including a cavity section such that the die sections cooperate to define a cavity within which the injection molding of the panel can be performed; inserts received within the cavity to provide depressed connection surfaces on one set of the connection lugs; and resilient mounts for resiliently positioning the inserts on one of the die sections while permitting movement thereof with respect thereto so that a molded panel can be conveniently removed from the die sections without a die lock situation that would prevent such removal.

2. A die as in claim 1 wherein the inserts comprise balls, and each resilient mount including a spring that resiliently positions the associated insert ball.

3. A die as in claim 2 wherein each resilient mount further includes a shaft having one end connected to the associated insert ball and another end biased by the associated spring.

4. A die as in claim 3 wherein each resilient mount includes a counterbored hole within the die section on which the insert balls are mounted, each counterbored hole having a small end including a partial semispherical seat for receiving the associated insert ball and also having a large end for receiving the spring as well as an intermediate seat facing toward the large end of the hole, and each spring being of the helical type with the ball shaft extending therethrough and having a first end engaged with the seat of the associated hole and a second end that is engaged with the adjacent end of the ball shaft to provide the resilient biasing of the insert ball connected to the opposite end of the shaft.

* * * * *